(12) United States Patent
Blackwell

(10) Patent No.: US 8,726,383 B2
(45) Date of Patent: May 13, 2014

(54) FLOW DATA FOR SECURITY INTRUSION DETECTION

(75) Inventor: Aaron Kenneth Blackwell, Redding, CT (US)

(73) Assignee: CA, Inc., Islandia, NY (US)

( * ) Notice: Subject to any disclaimer, the term of this patent is extended or adjusted under 35 U.S.C. 154(b) by 338 days.

(21) Appl. No.: 13/026,788

(22) Filed: Feb. 14, 2011

(65) Prior Publication Data
US 2012/0210428 A1 Aug. 16, 2012

(51) Int. Cl.
*H04L 29/06* (2006.01)
(52) U.S. Cl.
USPC ............... 726/23; 726/22; 713/164; 713/187
(58) Field of Classification Search
USPC ............... 726/22–25; 713/164, 165, 167, 187
See application file for complete search history.

(56) References Cited

U.S. PATENT DOCUMENTS

| | | | |
|---|---|---|---|
| 5,278,901 A | 1/1994 | Shieh et al. | |
| 7,370,358 B2 | 5/2008 | Ghanea-Hercock | |
| 7,430,670 B1 * | 9/2008 | Horning et al. | 713/190 |
| 7,594,260 B2 | 9/2009 | Porras et al. | |
| 2008/0234999 A1 * | 9/2008 | Cohen et al. | 703/26 |

OTHER PUBLICATIONS

U.S. Appl. No. 12/855,135, filed Sep. 17, 2010.
Sawyer, John, "What's Going on? Monitor Networks to Thwart Intrusions", Information Week Analytics, Strategy Session, Report ID: S1810910, Sep. 2010, 13 pages.

* cited by examiner

*Primary Examiner* — Justin T Darrow
(74) *Attorney, Agent, or Firm* — Vierra Magen Marcus LLP

(57) ABSTRACT

Disclosed herein are techniques for detecting possible security intrusions in a computer network. The security intrusion detection may be based on analyzing patterns of how transactions flow through one or more software applications. For example, patterns of transaction flows are determined for an initial time period to establish a baseline of normal flow patterns. These normal flow patterns may be compared with patterns for transaction flows for a later time period. Deviations in the patterns of transaction flow may indicate a possible security intrusion.

24 Claims, 9 Drawing Sheets

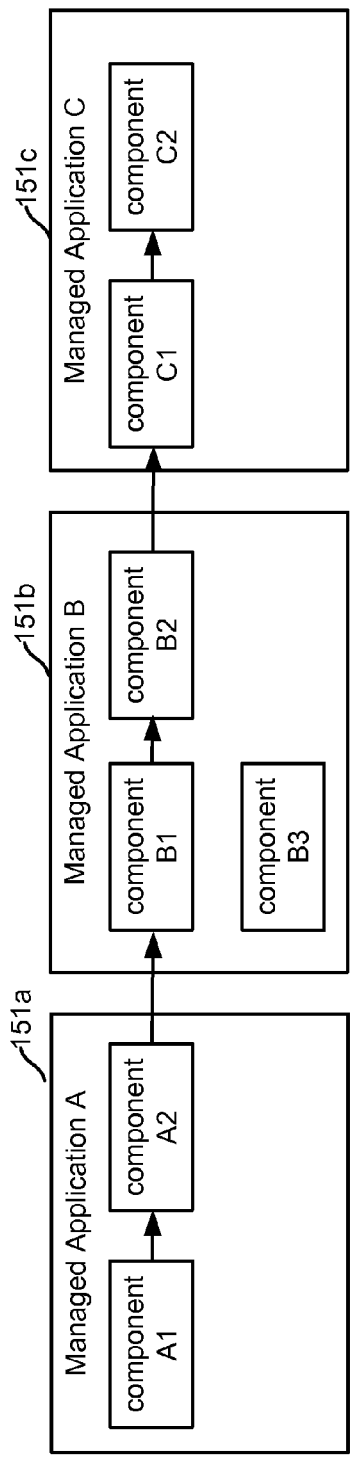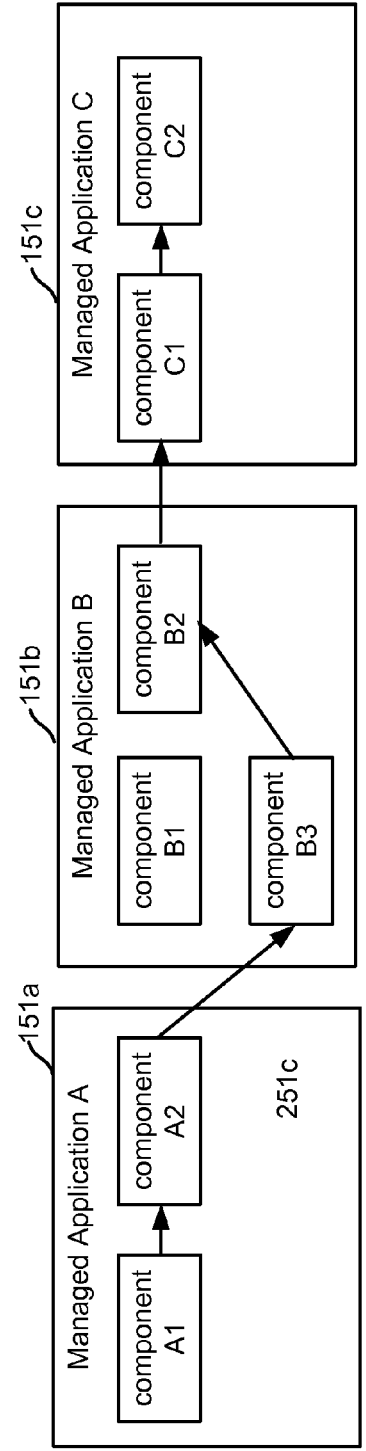

---

FLOW DATA FOR SECURITY INTRUSION DETECTION

BACKGROUND

1. Field

The present disclosure is directed to technology for monitoring software in a computing environment.

2. Background

The growing presence of the Internet as well as other computer networks such as intranets and extranets has brought many new applications in e-commerce, education and other areas. Organizations increasingly rely on such applications to carry out their business or other objectives, and devote considerable resources to ensuring that they perform as expected. Naturally, security measures are taken to protect valuable resources, such as content of databases. Unfortunately, some may attempt to take advantage of security vulnerabilities. Therefore, network intrusion detection software has been developed to detect possible attempts to breach security.

Some network intrusion detection software primarily relies on an analysis of a cross-section of network traffic at a single logical point in end-user interactions. As one example, packets that enter a network may be "sniffed". As another example, web server access logs can be analyzed. Security software can analyze these end-user interactions for patterns in the data that may indicate certain types of attacks.

To improve their effectiveness, some security software may increase the sophistication of the pattern recognition algorithms used to detect possible attempts to breach security. These sophisticated algorithms may benefit from rich sources of input data. However, too much data may overwhelm the algorithms to the point of diminishing their utility.

Also, one of the hardest problems is detecting insider security threats. Most often, the raw data needed to identify insider threats is much more difficult to capture since insiders usually do not go through the same level of application security as external users. Insider threats may also come from malicious custom software that takes advantage of embedded programmatic interfaces that are inherently unexposed to the outside world but that are still vulnerable to insiders with more intimate knowledge of information technology (IT) systems. A simple example might be a rogue programmer that utilizes a remote Enterprise JAVA Beans (EJB) call to initiate a fraudulent transaction that would normally be accessed through HTTP interfaces which may be logged and more proactively secured.

Thus, improvements are desired in detecting possible attempts to breach security of a computer network. While substantial amounts of data may be available to be mined for use in network intrusion detection, using too much data and/or data at too granular of a level may lessen the effectiveness of network intrusion detection algorithms. Further, techniques that are better at detecting insider security threats are desired.

BRIEF DESCRIPTION OF THE DRAWINGS

FIGS. 5A and 5B depict different flows for an example transaction.

DETAILED DESCRIPTION

Disclosed herein are techniques for detecting possible security intrusions in a computer network. The security intrusion detection may be based on analyzing patterns of how transactions flow through one or more software applications. For example, patterns of transaction flows are determined for an initial time period to establish a baseline of normal flow paths or patterns. These normal flow patterns may be compared with patterns for transaction flows for a later time period. Deviations in the patterns of transaction flow may indicate a possible security intrusion.

In some embodiments, application mapping data is used as input to a security monitor. The application mapping data may describe various sequences of software components that are invoked for some purposes. For example, a given sequence of software components may be invoked to process a type of transaction. As a particular example, when a user places an order to purchase a book with an online retailer, various software components may be invoked on the retailer's web site. The application mapping data may identify applications and/or software components that are invoked to process the transaction. However, note that it is not necessary for the application mapping data to identify every software component that is invoked, as this may unnecessarily complicate the description of the transaction flow. As one example, the mapping data may identify a software component at a front end of each application and a software component at a back end of each application. Note that tracing transactions is one example of how application mapping data can be generated; however, the application mapping data does not necessarily relate to tracing transactions.

Figure 1A:
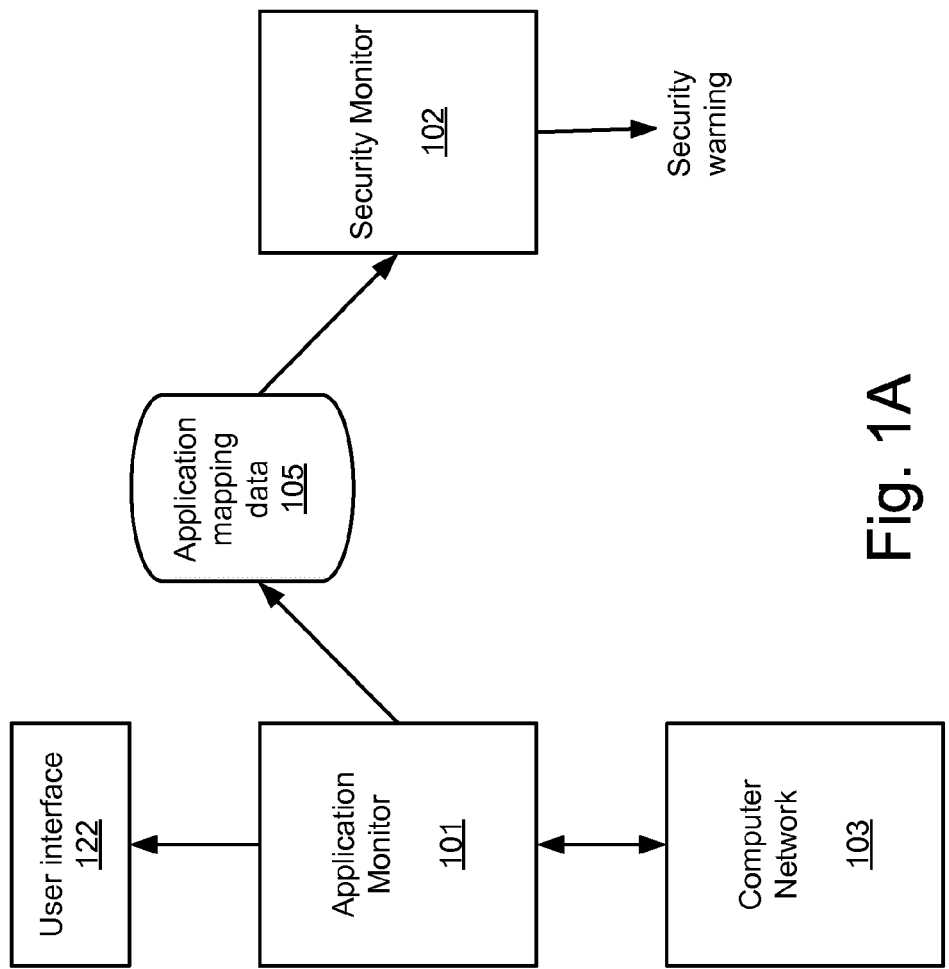
FIG. 1A is a structural overview of one embodiment of a system for detecting possible security intrusions in a computer network.

FIG. 1A is a structural overview of one embodiment of a system 100 for detecting possible security intrusions in a computer network. The system includes an application monitor 101 that monitors software applications running in computer network 103. The security monitor 102 detects possible attempts to breach the security of the computer network 103.

The computer network 103 may process transactions such as user logins, online merchandise purchases, credit card transactions, etc. In one embodiment, the application monitor 101 may generate application mapping data 105 that describes how transactions flow through the computer network 103. For example, for a given type of transaction, the application mapping data 105 may describe a sequence of software components in the computer network 103 that are invoked. Note that this sequence typically does not include all of the software components that are invoked for a given transaction. In some cases, the transaction may flow through multiple applications, and the application mapping data 105 may identify two software components per application. In one embodiment, the application monitor 101 may generate application mapping data that describes a sequence of software components that are invoked for some purpose. The purpose may be to process some transaction (such as a user buying a book); however, the sequence of software components may be invoked for a purpose other than performing a transaction.

One use of this application mapping data 105 is to present a graphical display on a user interface 122 to show applications and software components used in the transaction flow. Typically, a limited number of software components are shown so as to provide the user with pertinent information, without overwhelming the user with too much detail. Certain performance information, such as the average time a transaction took at a specific point in the transaction flow, may be presented to the user. The mapping of the transaction flow may be used to help the user identify problems such as bottlenecks. The application mapping data 105 may be stored in a database, or provided directly to the security monitor 102. Note that the application mapping data 105 is one type of transaction flow data.

Another use of the application mapping data 105 is as an input to the security monitor 102. The security monitor 102 analyzes the application mapping data 105 to find flow patterns. After determining what normal flow patterns look like, the security monitor 102 continues to receive new application mapping data 105, which it analyzes for present flow patterns. If these present flow patterns deviate from the normal flow patterns, this may indicate a possible attempt at a security breach. The security monitor 102 may issue a security warning to an operator to investigate the possible security breach. This warning may take many forms such as an electronic communication (e.g., email, instant message, etc.), report, etc.

Figure 1B:
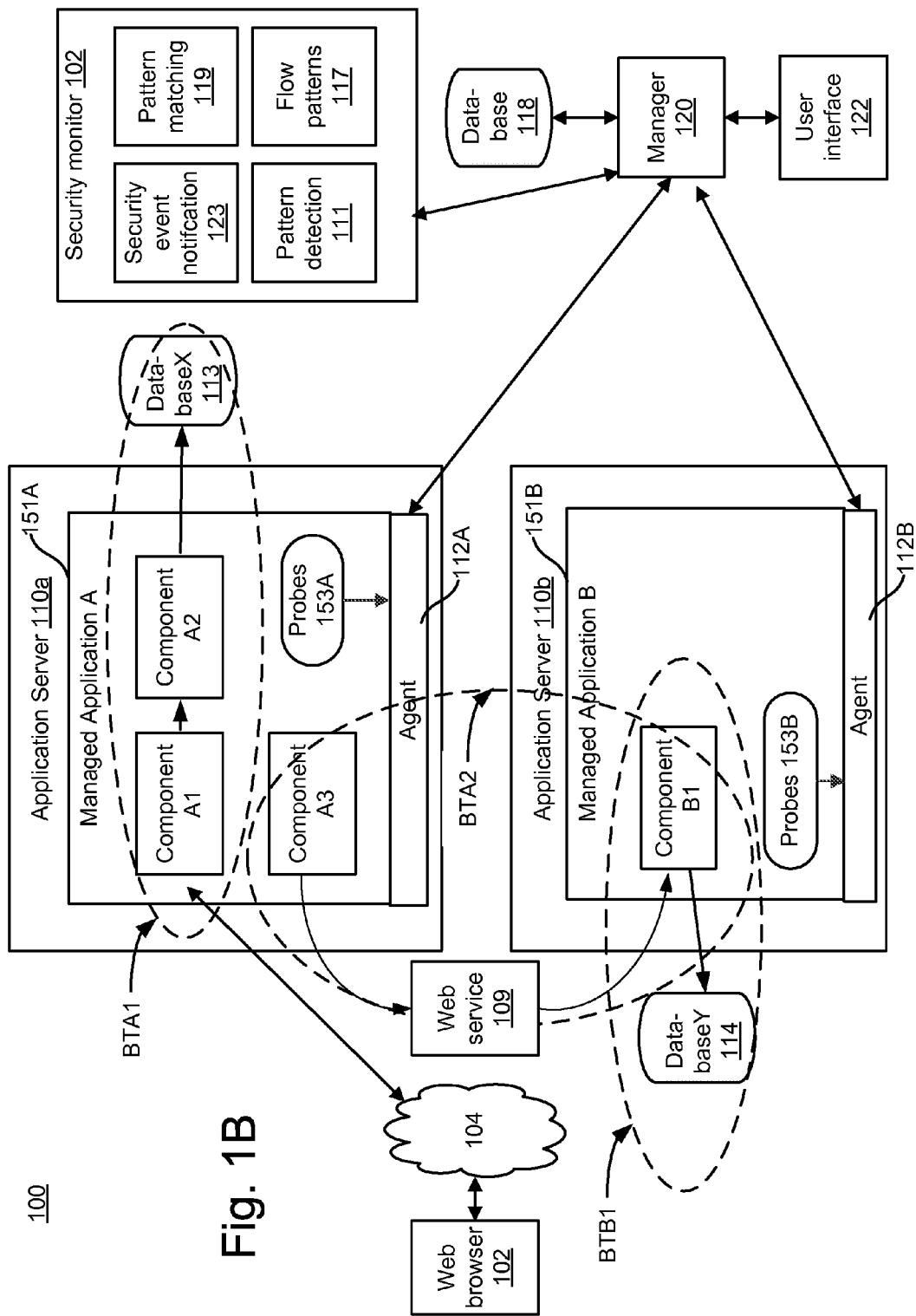
FIG. 1B provides further details of one embodiment of the system of FIG. 1A.

FIG. 1B provides further details of one embodiment of the system of FIG. 1A. FIG. 1B depicts a system 100 in which different computer systems provide data to a manager 120. The computer network 103 includes application servers 110a, 110b, web service 109, and databases 113, 114. The application monitor 101 includes the manager 120, database 118, as well as agents 112 and probes 153 in the applications 151.

The security monitor 102 receives application mapping data 105 (or transaction flow data) from the manger 120, which it analyzes with pattern detection logic 111 to determine flow patterns 117, which it stores. The security monitor 102 has pattern matching logic 119 which it uses to compare flow patterns from different time periods to determine whether there may be a security intrusion in the computer network. The security monitor 102 has security event notification logic 123 for transmitting an alert upon detecting a possible security threat. The various logic in the security monitor 102 may be implemented as computer readable instructions that are executed on one or more computer processors. In some embodiments, the flow patterns 117 are patterns in transaction flows. For example, the flow patterns 117 could be a sequence of software components that are invoked when processing a particular type of transaction.

The application servers 110 can run different applications, or separate instances of the same application. The application servers 110 can be located remotely from one another or co-located. The application servers 110 communicate with a manager computer 120, in this example. The Manager 120 could be local or remote from the application servers 110.

For example, a corporation running an enterprise application such as a web-based e-commerce application may employ a number of application servers at one location for load balancing. Requests from users, such as from an example web browser 102 of a user, are received via the network 104 such as the Internet, and can be routed to any of the application servers 110. The web browser 102 typically accesses the network cloud 104 via an Internet Service Provider, not shown.

Application servers 110a, 110b include managed application A 151A and managed application B 151B, which includes agents 112A, 112B and example probes 153A, 153B. There may be any number of probes. The distinction between elements having a letter in the reference numeral (e.g., application servers 110a, 110b) is made for purposes of discussion. Herein, the use of reference numerals without an "a," or "b," indicates that no particular server or other element is being referred to. Application 151 can be a Java® application or a different type of application. Thus, agent software running on the application servers 110, denoted by Agent 112, gather information from a managed application 151, middleware or other software, running on the application servers 110, in one possible approach. For example, information from the application 151 can also be obtained using probes 153. In practice, many such probes can be used to obtain information regarding different components of the application 151. In some embodiments, the probes may be added to the application 151 using instrumentation, one example of which is byte code instrumentation. However, the gathered data may be obtained in other ways as well. The agents 112 essentially live in the computer system being monitored and provide a data acquisition point. The agents 112 organize and optimize the data communicated to the manager 120.

For purposes describing transaction flows, software components that process transactions are depicted in the managed applications 151. The software components could include any piece of code within a managed application 151 or any piece of code outside of a managed application. For example, the software components within the managed application 151 could include, but are not limited to, Servlets, plain old Java objects (POJOs), Enterprise JavaBeans® (EJB®), sockets, etc. Software components outside the managed application 151 may include those with which the managed application 151 interacts; however, direct interaction is not required. Software components outside the managed application 151 could include, but are not limited to, databases, web services, web browsers, etc.

The flows of three separate transactions are depicted in FIG. 1B. By the flow of a transaction it is meant a sequence of some of the software components that are invoked to process the transaction. Transaction BTA1 may be initiated in response to an HTTP request from the web browser 102, as one example. For transaction BTA1, the flow is from component A1 to component A2 to DatabaseX 113. Note that the flow may be depicted as moving in one direction, although often the flow may in fact return. For example, after the database call, the flow could return to component A2 and then to component A1 to provide a response to the web browser 102. However, the return flow is not necessarily needed to adequately describe the transaction flow. Also note that there may actually be many more software components involved with transaction BTA1. However, not all of the software components may be of interest to a user. For example, there might be one or more software components along the transaction between component A1 and component A2. Also, there might be one or more components along the transaction between component A2 and DatabaseX 113. For example, there might be a socket between component A2 and DatabaseX 113. However, the socket might not be of interest to the user. For transaction BTA2, the flow is from component A3 to Web Service 109 to component B1. The flow from component B1 to DatabaseY 114 could also be considered to be part of transaction BTA2 if, for example, it was caused by the call from component A3 to component B1. The transaction BTA2 generates a transaction BTB1 with respect to ApplicationB. Specifically, the flow for transaction BTB1 is from component B1 to DatabaseY 114.

For the sake of discussion, transaction BTA1 might be a "Buy Transaction," that allows a user (at web browser 102) to buy a book or some other item. For the sake of discussion, transaction BTA2 might be a "Check Credit Transaction," that authorizes the use of a credit card for purchasing the book. Note that over time there may be many different instances of transaction BTA, as different users visit the website. Thus, transaction BTA1 may be referred to as a "type of transaction," for which there may be many instances.

In some embodiments, the agents 112 collect data that describes dependencies between the software components as transactions are processed and supply that data to the manager 120. The manager 120 may aggregate that data to form a directed graph ("digraph") that represents dependencies between the software components as the software components process the transactions. For example, the digraph may have vertices that represent the components and edges that represent the dependencies between the components. A dependency map may then be displayed on a display screen such as user interface 122 based on the digraph. The dependency map shows dependencies as the transactions are processed. The dependency map can have various levels of detail. For example, it might show dependencies between the software components. However, the dependency map could be more general and show dependencies between the applications 151 (perhaps not even showing the software components). In some embodiments, flow data is extracted from the digraph and provided to the security monitor 102.

Figure 2:
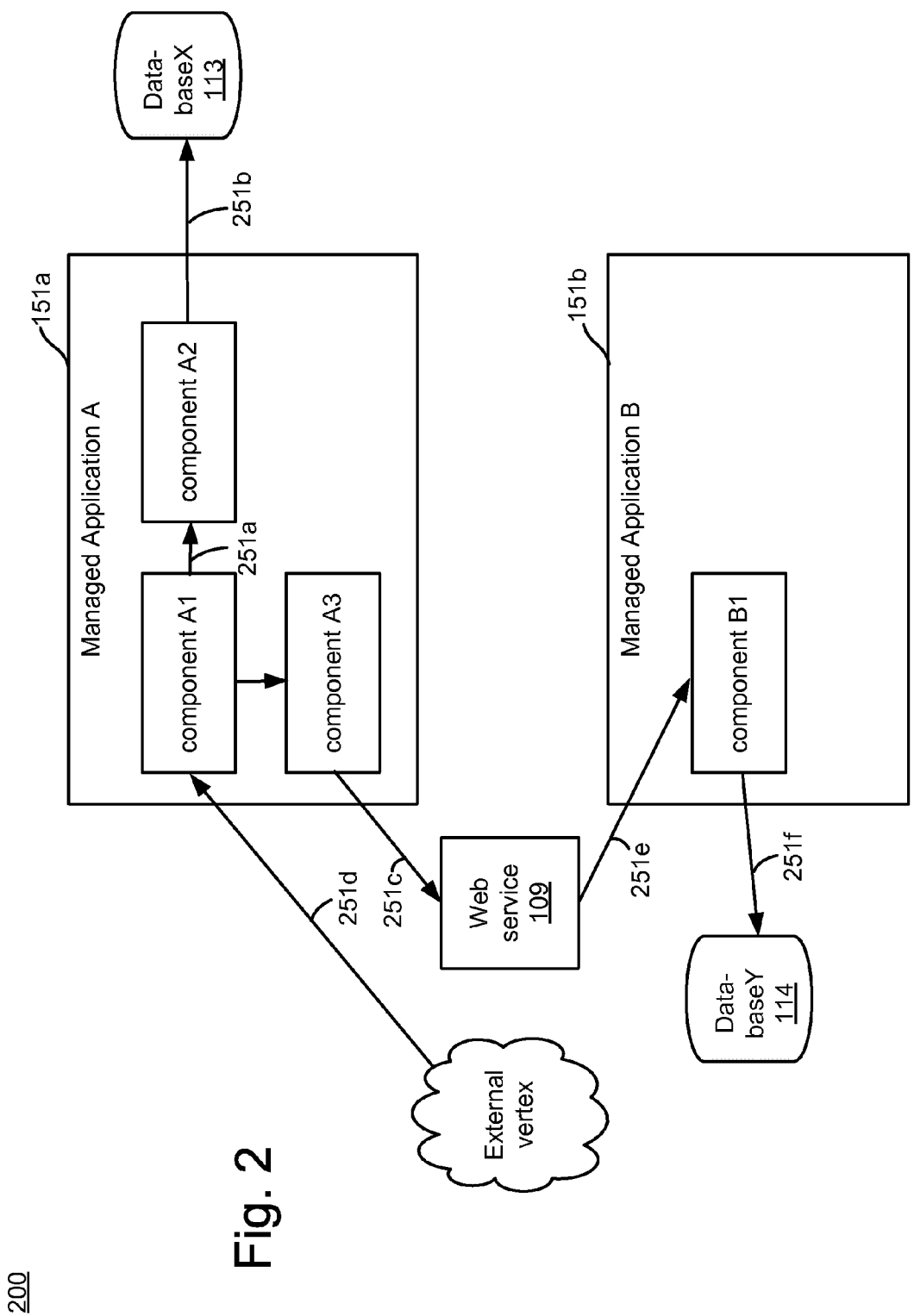
FIG. 2 depicts one example of a dependency map that could be presented on a display screen.

FIG. 2 depicts one example of a dependency map 200 that could be presented on a display screen (such as user interface 122). Various performance metrics, such as the average time spent at one point in the transaction flow, might also be presented. As previously noted, this may help the user to analyze system performance. Moreover flow data may be extracted from this dependency map 200 (or from a digraph or other structure used to create the dependency map 200). This flow data may be provided to the security monitor 102.

The example dependency map 200 may show dependencies between software components of system 100 when processing transactions. In this example, the dependency map 200 pertains to some transactions processed by Applications A and B. For example, the dependency between component A1, component A2, and databaseX 113 is represented by the arrows connecting those components. Note this corresponds to transaction BTA 1. The dependency between component A3, web service 109, component B1, and databaseY 114 is represented by the arrows connecting those elements. Note this corresponds to transaction BTA2. Another possibility is to show fewer details for managed application B 151*b*, since the user only requested details for Application A. For example, component B1 and/or database Y 114 might not be depicted. Instead there might just be an arrow from web service 109 to managed application B 151*b*.

The dependency map 200 may include vertices and edges. A vertex may correspond to a software component. For example, in FIG. 2, vertexes could be "external vertex," component A1, component A2, component A3, DatabaseX, web service 109, component B1, and Database Y. Also note that the term "external vertex" is being used to refer to one type of vertex that is outside of the application server. In this case, the external vertex represents some software component that sent an HTTP request to managed application A 151A. Note that the user might not be interested in exactly which software component sent the HTTP request. Therefore, using the generic term "external vertex" may provide sufficient description. However, if details of that software component are important to the security monitor 102, then that information might be collected. Note that in some cases, that external vertex is not even reported to the security monitor 102.

Several edges 251*a*-251*f* are labeled in FIG. 2. An edge represents a dependency between a pair of software components. In general, an edge may be described as an ordered pair of two software components. Edges are represented as arrows in FIG. 2. The tail and head of the arrow may be used to define the order of the software components in the ordered pair. For example, edge 251*a* may be described as (component A1, component A2). Edge 251*b* may be described as (component A2, Database X). Note that when processing a transaction, there may be other software components invoked between the ordered pair of software components. Thus, the second software component is not necessarily invoked by the first software component in the ordered pair. For example, component A2 is not necessarily invoked directly by component A1.

In some embodiments, the flow data includes "component pairs." Herein, the term "component pair" means an ordered pair of two software components. Referring to FIG. 2, each of the edges 251 connects an ordered pair of two software components. Note that with this definition of component pair that a sequence of component pair can be described for a given transaction. As one example, one sequence of component pairs could be: (external vertex, component A1), (component A1, component A2), (component A2, DatabaseX). Note that a given component may appear in more than one component pair using this method of description. However, the sequence could be described in a different manner.

One example of a component pair is a "front end/back end" component pair. A front end/back end component pair includes a "front end" software component at or near a "front end" of a managed application 151 and a "back end" software component at or near a "back end" of a managed application 151. In this context, the front end software component is invoked prior to the back end software component. Note that the front end software component may not be the very first software component that is invoked in the managed application 151 when processing the transaction. For example, the very first software component that is invoked might not be of interest to the user, or might not be as useful for analysis. Likewise, the back end software component may not be the very last software component that is invoked in the managed application 151 when processing the transaction. As one example, component A1 is one example of a "front end" software component and component A2 is one example of a "back end" software component. Thus, component A1 and component A2 are one example of a front end/back end component pair (in the context of a transaction that flows through these two components). As noted, there may be software components invoked between component A1 and component A2. Also, component A1 is not necessarily the very first software component that is invoked in managed application 151 when processing a transaction.

In some embodiments, the application monitor 101 sends front end/back end component pairs to the security monitor 102, but does not necessarily send other component pairs. For example, the component pair of (component A1, component A2) may be sent. However, the component pair of (external vertex, component A1) is not necessarily sent to the security monitor 102. More generally, the application monitor 101 may send to the security monitor 102 any subset of the component pairs (including all component pairs) that it generates.

In some embodiments, a software component exists outside of a managed application. Thus, a component pair could include a software component inside of a managed application 151 and a software component outside of a managed application 151. One example of this is a component pair of component A3 in managed application A and the Web service 109. A second example of this is the web service 109 and component B1 in managed application B.

Note that it is also possible to simplify the map by removing some of the components. For example, the web service 109 could be removed, in which case component A3 would be connected to component B1. This is one example of pruning. The application monitor 101 may prune in order to present a simplified view of the transaction for the user on the user interface 122. The application monitor 101 may also prune in order to provide a suitable level of detail for the security monitor 102.

Returning again to the discussion of FIG. 1B, in one embodiment, a probe builder (not shown in FIG. 1B) instruments (e.g., modifies) bytecode for managed applications 151 to add the probes 153 and additional code. The probes 153 may measure specific pieces of information regarding the managed applications 151 without changing the applications' business logic. One type of probe measures the amount of time that a component spent executing. The amount of time could include the time spent executing by components invoked by the component having the probe, but that is not required. The probe 153 may have a begin point at an entry point of the component and an end point at each exit of the component. In one embodiment, the begin point starts a timer and the end point stops the timer. A probe 153 may collect other information besides timing information.

The probe builder may also add agent 112 which may be installed on the same machine as applications 151 or a separate machine. Once the probes 153 have been installed in the application 151, or a monitoring capability has otherwise been provided, the application is referred to as a managed application. More information about instrumenting bytecode can be found in U.S. Pat. No. 6,260,187, "System for Modifying Object Oriented Code" by Lewis K. Cirne, and U.S. Pat. No. 7,512,935, "Adding Functionality to Existing Code at Exits," each of which is incorporated herein by reference in its entirety.

As managed application 151 runs, probes 153 send data to agent 112. For example, the information from the probes may indicate performance data such as start and stop times of a transaction or other execution flow, or of individual components within a transaction/execution flow. In one embodiment, probes 153 may be implemented in objects and other code that write data, change data or otherwise cause the state of an application server to change. This data may be referred to as application runtime data. The Agent 122 may also collect dependency data that describes dependencies between components as transactions are processed. Agent 112 then collects, summarizes and sends the application runtime data and the dependency data to Manager 120. In response, Manager 120 runs requested calculations, makes application runtime data available to user interface 112 and, optionally, sends the application runtime data to database 118 for later analysis. Manager 120 may also aggregate the dependency data to form a digraph and display one or more dependency maps based on the digraph. The Manager 120 may also send flow data based on the dependency data to the security monitor 102. More information regarding monitoring an application using probes can be found in U.S. Pat. No. 7,310,777, titled "User Interface for Viewing Performance Information about Transactions," by Lewis K. Cirne, incorporated herein by reference.

Manager 120 can be provided on a separate computer system such as a workstation which communicates with a user interface 122, such as a monitor, to display information based on data received from the agents. Manager 120 can also access a database 118 to store the data received from the agents. In the example provided, the application servers can communicate with Manager 120 without accessing the network 104. For example, the communication may occur via a local area network. In other designs, Manager 120 can receive data from the agents of a number of application servers via the network 104. For instance, some large organizations employ a central network operations center where one or more managers obtain data from a number of distributed agents at different geographic locations. To illustrate, a web-based e-commerce enterprise might obtain agent data from servers at different geographic locations that receive customer orders, from servers that process payments, from servers at warehouses for tracking inventory and conveying orders, and so forth. Manager 120 and user interface display 122 might be provided at a corporate headquarters location. Other applications which are not necessarily web-based or involve retail or other sales, can similarly employ agents and managers for managing their systems. For example, a bank may use an application for processing checks and credit accounts. Moreover, in addition to the multi-computer system arrangements mentioned, a single computer system can be monitored as well with one or more agents.

Figure 3A:
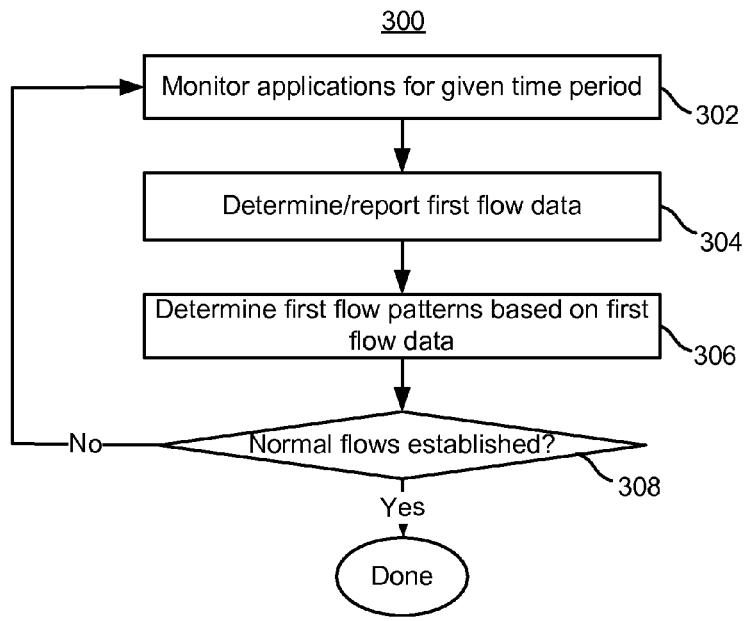
FIG. 3A is a flowchart of one embodiment of a process of establishing initial baseline flow patterns in mapping data, such as flow data.
Figure 3B:
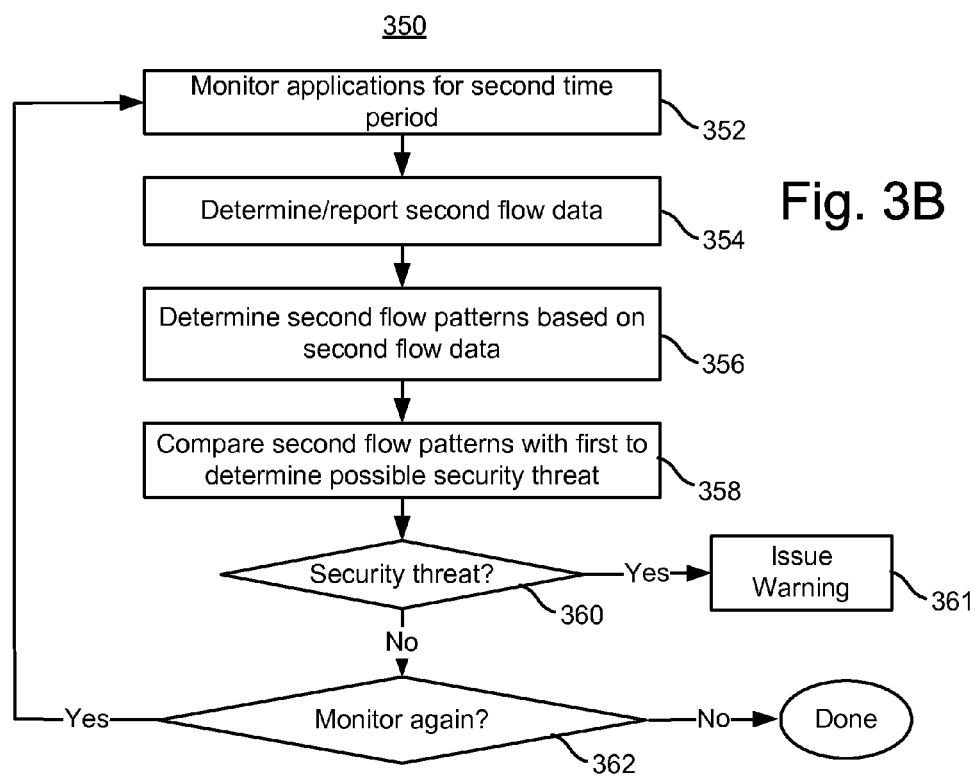
FIG. 3B is an overview of a process of analyzing flow patterns in later mapping data to detect possible security intrusions.

FIG. 3A is a flowchart of one embodiment of a process 300 of establishing initial baseline flow patterns in mapping data, such as flow data. FIG. 3B is a flowchart of one embodiment of a process 350 of analyzing flow patterns in later mapping data to detect possible security intrusions. After first discussing FIG. 3A, FIG. 3B will be discussed.

The process of FIG. 3A may be performed by a system such as the example of FIGS. 1A-1B. Reference will be made to elements in FIGS. 1A-1B for the purpose of illustration; however, FIGS. 3A and 3B are not limited to the example systems of FIG. 1A-1B. Some steps of the process of FIGS. 3A and 3B may be performed by the application monitor 101 and others by the security monitor 102. In step 302, the managed applications 151 are monitored by the application monitor 101 for a given time interval. This may include tracing transactions that are processed by the managed applications 151. Thus, the monitoring may be used to determine a baseline of transaction flows. This baseline may be assumed to be for normal flows with an assumption that there are no security intrusions for this time interval. It is possible that there may in fact be some attempts at security intrusion during this time interval. However, note that this baseline data may be collected for many different time periods such that data that does not reflect normal flows may be filtered out.

In step 304, the application monitor 101 generates a first set of flow data for the first time period. In some embodiments, the flow data is referred to as application mapping data. The flow data is reported to the security monitor 102. In some embodiments, the flow data identifies sequences of software components and counts for each sequence. A given sequence of software components may correspond to a certain transaction. Note that it is not required that the transaction be identified in the flow data. For example, the flow data might identify the sequence of component A1, component A2, and databaseX. While this might correspond to a "Buy Book" transaction, it is not required that the transaction be identified in the flow data. In some embodiments, the flow data contains a sequence of front end/back end component pairs. For example, referring briefly to FIG. 5A, the flow data might have the sequence of front end/back end component pairs: (component A1, component A2), (component B1, component B2), (component C1, component C2).

The flow data may also specify errors that occurred during a transaction. Note that an error does not necessarily refer to as a software error (although it might). Rather, an error might refer to a user error. An example of a user error is that the user entered the wrong credit card number during a credit card transaction. Or, an error might refer to computer hardware or network error. An example of a hardware error is a "disk full" error that is detected and handled by software. In general, an error in this context is anything that keeps a transaction from completing as the user expects, including erroneous actions of the user themselves.

In step 306, the security monitor 102 determines first (or baseline) flow patterns based on the flow data. An example of flow patterns is how many times a given sequence of software components were invoked. As noted above, a sequence of software components may correspond to a transaction. Thus, this may correspond to how many times this sequence of software components were invoked for a certain transaction. As will be discussed more fully below, a given transaction may have multiple flows. For example, 65% of the time a "buy book" transaction may have a first sequence of software components, while 35% it has a second sequence of software components.

As noted above, not all software components that are invoked during a transaction (or other processing) are reported. Thus, the flow data is not overloaded with information that is too detailed. However, sufficient detail may be provided to detect a possible security intrusion.

In some embodiments, the flow patterns that are determined in step 306 include a ratio of one flow for a transaction to another flow for that same transaction. For example, a buy book transaction may have two different flows (or have two different sequences of software components invoked). These will be referred to as flow A and flow B. It may that flow A occurred 80% of the time and flow B occurred 20% of the time.

In some embodiments, the flow patterns that are determined in step 306 include a percentage for each transaction flow. This may be the percentage relative to all of the data. For example, the aforementioned flow A may comprise 4% of all of the transaction flows, whereas flow B comprises 1%.

The process 300 of FIG. 3A may be performed one or more times in order to establish baselines. In step 308, a determination is made whether baselines for the flow patterns have been established. Either the application monitor 101 or the security monitor 102 may make this determination. For example, either the application monitor 101 or the security monitor 102 may determine when baselines are set by determining that the flow data does not contain any additional component pair combinations for the latest collection period. The security monitor 102 could make the determination by determining that no new flow patterns are detected in the latest collection interval. In either case, there may be some allowance for new component pair combinations or for new flow patterns. This is because due to changing circumstances in the computing environment or user requests, it may be inevitable that some changes will occur to the flows. Eventually, a determination is made that a suitable baseline has been determined. Note that the process may be repeated at any time to form new baseline data.

Also note that the process of FIG. 3A might be performed at different days of the week, different times of day, etc. in order to generate baselines for such different times. This may be useful if certain types of transactions might occur with greater frequency at certain times. For example, it may be that credit card transactions occur with highest frequency between 5-8 pm on Monday-Thursday. Therefore, different baselines might be used for these periods than others.

After forming the baseline data, process 350 of FIG. 3B is performed to collect and analyze a new (second) set of flow data. Process 350 then determines whether a possible security threat is occurring by comparing flow patterns in the second set with the baseline flow patterns. In general, process 350 may be performed in real time, such that a possible security threat that is ongoing may be detected. Process 350 may be performed in part by the application monitor 101 and in part by the security monitor 102.

In step 352, the managed applications 151 are monitored for a second time interval. In one embodiment, the application monitor 101 traces transactions. Note that the application monitor 101 may trace transactions in the managed applications 151 as a part of determining various performance metrics, such as average response times. Therefore, collecting the flow data does not necessarily incur any additional overhead with respect to execution of monitoring code in the managed applications 151.

In step 354, the application monitor 101 generates a second set of flow data (e.g., application mapping data) for the second time period. The second set may be similar to the first set such that it can be compared to the first set. This flow data is reported by Manager 120 to the security monitor 102.

In step 356, the security monitor 102 determines second flow patterns based on the second flow data. For comparison purposes these may be the same types of flow patterns that were determined in step 306.

In step 358, the security monitor 102 compares the second flow patterns to the first (e.g., baseline) flow patterns to determine whether a possible security intrusion is occurring or has occurred. As noted above, the baseline data may have been collected for some specific time period (e.g., 5 pm-8 pm Monday-Thursday). If so, then the baseline data that is used in step 358 is the data that corresponds to the present time period.

One example of comparing the two flow patterns is for the security monitor 102 to determine that flow A of a Buy Book transaction is now occurring 40% of the time, whereas flow B is occurring 60% of the time. The relative increase in flow B could indicate a possible security intrusion. For example, a hacker may be attempting to exploit a perceived vulnerability along flow B by repeated attempts to gain access to a database.

As another example, initially flow A of the Buy Book transaction might have been 4% of all transaction flows. However, this might increase to 20% of all transaction flows. This might indicate that a hacker is attempting to exploit a perceived vulnerability along flow A. Further examples will be discussed below. If a possible security threat has been detected (step 360) an alert may be issued (step 361). The process 350 may then be repeated again as often as desired (step 362). Note that process 350 can be performed again using the same baseline data that was previously used. Alternatively, the baseline data could be updated based on the second flow data that was collected during process 350.

Figure 4A:
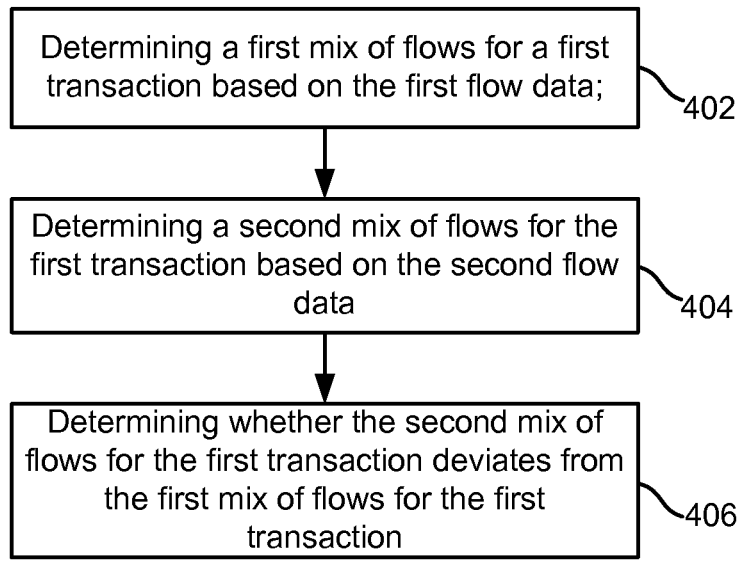
FIGS. 4A and 4B are flowcharts of embodiments of the security monitor processing flow data to determine whether a security breach is being attempted.
Figure 4B:
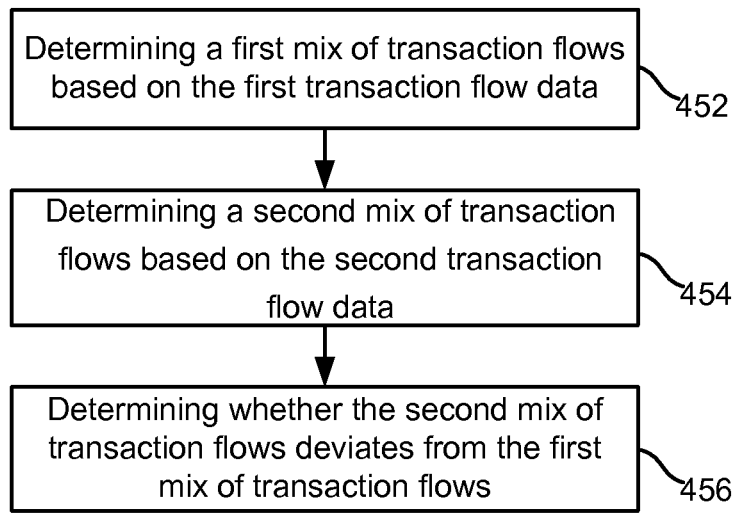

FIGS. 4A and 4B are flowcharts of embodiments of the security monitor 102 processing flow data to determine whether a security breach is being attempted. Each flowchart provides further details for embodiments of steps 306, 356, and 358 from FIGS. 3A and 3B. FIG. 4A is a process 400 in which techniques are based on analyzing a change in the mix of flows of a single type of transaction. For example, the flow pattern for a credit card transaction may change. Note that it is not necessary for the security monitor to be aware of the type of transaction.

In step 402, a first mix of flows for a particular transaction is determined based on the first flow data. Step 402 determines baseline data. An example of a mix of flows for a particular transaction is that a Buy Book transaction follows flow A 80% of the time and flow B 20% of the time. FIGS. 5A and 5B depict different flows for an example transaction which is processed by managed applications 151*a*, 151*b*, and 151*c*. As can be seen in FIG. 5A, the transaction flow includes the sequence (component A1, component A2, component B1, component B2, component C1, component C2). This sequence can be considered to be three "front end/back end" component pairs (one pair in each managed application 151). Note that the transaction flow data that gets reported to the security monitor 102 may specify a count of how many times this sequence was observed over some time interval. The sequence in FIG. 5B represents a different flow for the same transaction. Note that in this case, component B3 was invoked instead of component B1. Note that the application monitor 101 could identify both of these flows as corresponding to the same transaction by, for example, how the sequence was initiated. For example, each sequence may have been initiated by an HTTP request from a user to buy a book (e.g., Buy Book transaction). Thus, the flow data may indicate that the component sequence of FIGS. 5A and 5B are for the same transaction (or linked in some other manner). The security monitor 102 may compare the counts of each flow (e.g., FIGS. 5A and 5B) for the time interval to determine the mix of flows for the particular transaction. Step 402 is one embodiment of step 306 of FIG. 3A. Thus, the first mix may be a part of the baseline flow patterns.

In step 404, the security monitor 102 determines a second mix of flows for the transaction. This second mix is for a time period after the baselines have been established. Step 404 is one embodiment of step 356 of FIG. 3B. Determining the second mix may be similar to determining the first mix. Thus, the security monitor 102 may determine that the flow of FIG. 5A happened 40% of the time and the flow of FIG. 5B happened 60% of the time.

In step 406, the security monitor 102 compares the second mix of flows for the transaction with the first mix to determine whether there may be an attempted security intrusion. As one example, the security monitor 102 determines whether the second mix deviates from the first mix by more than some threshold amount. In the present example, the security monitor 102 determines whether the fact that flow of FIG. 5B. Step 406 is one embodiment of step 358 of FIG. 3B.

FIG. 4B discusses a process 450 for determining a possible security threat that is based on analyzing a change in the mix of transaction flows. A difference between the process of FIGS. 4B and 4A is that the process 400 of FIG. 4A may involve analyzing a single transaction at a time. However, the process 450 of FIG. 4B may involve analyzing many different types of transactions at a time. For example, a significant increase in the number of credit card transactions, relative to the rest of the type of transactions, may indicate an attempted security breach. Note that it is not necessary for the security monitor 101 to be aware of the type of transaction. Instead, the security monitor 101 could analyze based on sequences of components.

In step 452, the security monitor 102 determines a first mix of transaction flows is determined based on the first flow data. As one example, the mix might be 4% credit card transactions, 7% buy a product transaction, 23% login transactions, etc. As noted above, the security monitor 102 does not necessarily have to be aware of what transaction a given sequence of component pairs is associated with. For example, the flow data might simply list sets of component pairs (and a count of each set). In this case, the security monitor 102 would determine a first mix of sequences of component pairs. For example, the security monitor 102 determines that the sequences of component pairs depicted in FIG. 5A occurs x % of the time, etc.

Note that this mix may be on the basis of unique flows, as opposed to being on a per transaction type basis. For example, the two flows in FIGS. 5A and 5B might both correspond to a "buy book" transaction. However, for purposes of determining the mix of transaction flows, they can be treated as two separate percentages. On the other hand, if the flow data specifies that the flows of FIGS. 5A and 5B are for the same transaction, the security monitor 102 could combine the counts for both flows. Step 452 is one embodiment of step 306 of FIG. 3A. Thus, step 452 determines a baseline or "normal mix" of transaction flows.

In step 454, the security monitor 102 determines a second mix of transaction flows based on the second flow data. As noted above, the second flow data is collected after the baseline or "normal mix" of transaction flows is established. Step 454 is one embodiment of step 356 of FIG. 3B.

In step 456, the security monitor 102 determines whether the second mix of transaction flows deviates from the first mix of transaction flows by more than some threshold amount. Numerous ways can be used to set the threshold. Since the frequency of some types of transactions might be expected to vary based on factors such as day of week, time of day, etc., the threshold may also change on such a basis. Also, a different threshold might apply to different transactions. For example, there might be a lower threshold for credit card transactions. In some embodiments, the security monitor 102 determines whether a second mix of sequences of components deviates from the first mix of sequences of components in step 456. Step 456 is one embodiment of step 356 of FIG. 3B.

Figure 5C:
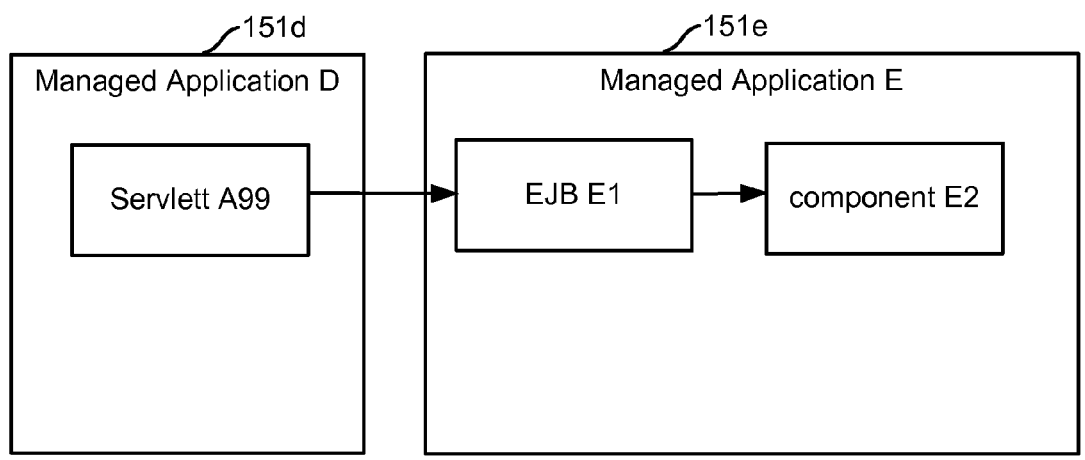
FIGS. 5C and 5D represents two example sequences of software components for transaction flows.

The flowcharts of FIGS. 4A-4B are two examples of how the security monitor 102 might analyze flow data to determine flow patterns and then determine a possible security threat. However, there are many other techniques that might be used. The following are a few additional techniques. One technique is for the security monitor 102 to determine if a new transaction flow suddenly appears. The transaction flows in FIGS. 5C and 5D represents two example sequences of software components that will be used to discuss two different examples of a new transaction flow.

Note that many systems have a finite number of transaction flows that are likely to occur. Once the application monitor 101 has monitored for awhile, it may likely have discovered all the possible flows that can be initiated from normal application traffic flow patterns. Once this state is achieved, any new transaction flow patterns may be highly suspect for an intrusion attempt, especially by insiders with explicit knowledge of the computer network 103. For example, referring to FIG. 5C if a new component pair with a previously unknown Servlet A99 in managed application 151*d* calling known EJB E1 in managed application 151e, this could be a strong indication that Servlet A99 has been injected into the system by an insider and is attempt to do something nefarious through EJB E1 in a way that is not detectable to external monitoring security software.

Figure 5D:
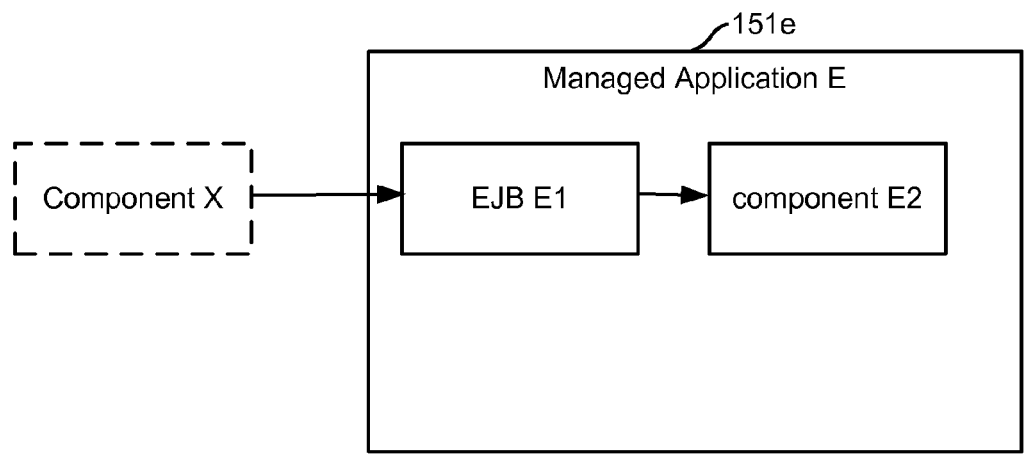

In the example of FIG. 5D, the flow data identifies the components in managed application E 151e. However, the flow data does not specify what component called component EJB E1. Note that under normal circumstances it may be expected that the flow data would specify the calling component. Component X is depicted to show that it was in fact the component that called component EJB E1, but for some reason the tracing did not reveal this fact. This may be because component X is not in a managed application 151. Alternatively, component X might be in a managed application 151, but there are no probes installed to monitor component X. A possible reason for why component X is not being monitored is that it was nefariously inserted by someone attempting to breach security. For example, an insider might have deployed a servlet in an unmonitored application such that the application monitor 101 will not even know where the call came from. This may be the ultimate insider threat because it provides a way to cover the intruder's tracks. Embodiments herein will not necessarily identify the caller, but are able to drive the right information into the security monitor 102 to identify the threat and lead the security triager to track down the source of the security threat.

Figure 6A:
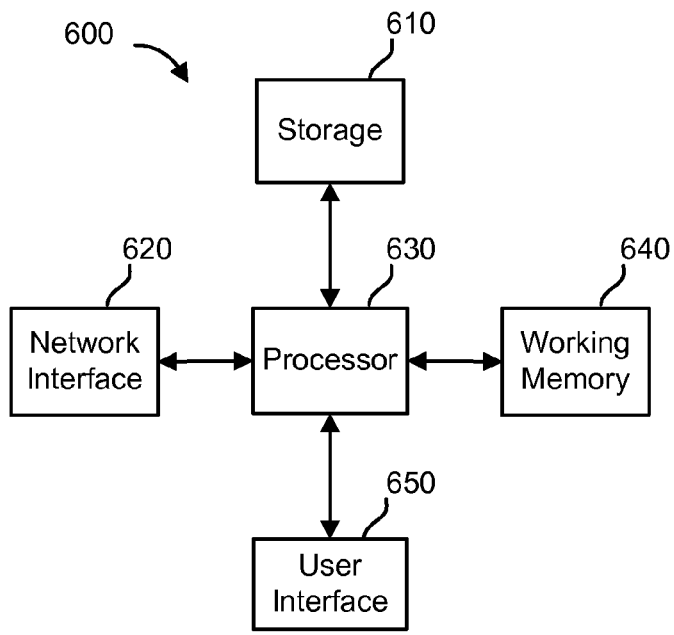
FIG. 6A depicts one embodiment of a computer system that may be used in the network of FIGS. 1A-1B.

FIG. 6A depicts one embodiment of a computer system that may be used in the network of FIGS. 1A-1B. The computer system 600 is a simplified representation of a system which might be used as the security monitor 102, web browser 102, host (such as application servers 110), Manager 120 and/or user interface 122, such as discussed in connection with FIGS. 1A-1B. The computer system 600 includes a storage device 610 such as a hard disk or portable media, a network interface 620 for communicating with other computer systems, a processor 630 for executing software instructions, a working memory 640 such as RAM for storing the software instructions after they are loaded from the storage device 610, for instance, and a user interface display 650. The storage device 610 may be considered to be a processor readable storage device having processor readable code embodied thereon for programming the processor 630 to perform methods for providing the functionality discussed herein. The user interface display 650 can provide information to a human operator based on the data received from one or more agents. The user interface display 650 can use any known display scheme, whether graphical, tabular or the like. In addition to an on-screen display, an output such as a hard copy such from a printer can be provided.

Further, the functionality described herein may be implemented using hardware, software or a combination of both hardware and software. For software, one or more processor readable storage devices having processor readable code stored thereon for programming one or more processors may be used. The processor readable storage devices can include computer readable storage such as volatile and nonvolatile media, removable and non-removable media. For example, computer readable storage may include volatile and nonvolatile, removable and non-removable media implemented in any method or technology for storage of information such as computer readable instructions, data structures, program modules or other data. Examples of computer readable storage include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. In alternative embodiments, some or all of the software can be replaced by dedicated hardware including custom integrated circuits, gate arrays, FPGAs, PLDs, and special purpose processors. In one embodiment, software (stored on a storage device) implementing one or more embodiments is used to program one or more processors. The one or more processors can be in communication with one or more computer readable storage devices, peripherals and/or communication interfaces.

Figure 6B:
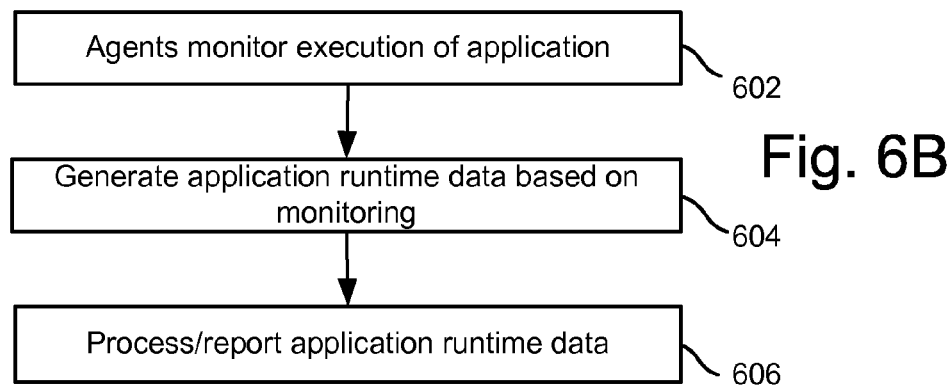
FIG. 6B illustrates a flowchart of an embodiment of a process of monitoring applications.

In some embodiments, the agents 112 monitor the applications 151 and transfer application runtime data to Manager 120, where the data is analyzed and reported to a user. FIG. 6B illustrates a flowchart of an embodiment of a process of monitoring applications 151. The process may be performed in the example system 100 of FIGS. 1A-1B. An application 151 is monitored by agents 152 at step 602. Monitoring may involve agents 112 determining which transactions of application server 110 are processed and the duration for which they are invoked when the application processes a client request. Monitoring may also involve agents 112 determining dependency data as components process transactions. Some examples of dependency data are discussed below. Step 602 may include probes in the application 151 executing to collect data.

Application runtime data based on the monitoring of the application is generated at step 604. The generated application runtime data can indicate the application components involved in processing a request, the duration that each component consumed in processing a request, and other information. The application runtime data can be generated by agent 112, based on data that results from execution of the probes, after which the agent 112 may forward the generated application runtime data to Manager 120. Generally, application runtime data can include information such as average component (e.g., method) execution time, a component invocation rate per second or per interval, a count of component invocations, a concurrency metric indicating number of component invocations that have started but not finished per interval, and a stalled metric indicating a number of component invocations that have started whose component invocation times have exceeded a specific threshold per interval. Further, application runtime data can identify a garbage collection heap size, a bandwidth metric indicating file and socket activity, a number of threads, system logs, exceptions, memory leaks and component interactions. Note that the application runtime data may be linked to particular transactions being processed by the managed application 151.

The application runtime data may be processed and reported by Manager 120 at step 606 such as by aggregating the data, storing the data, and providing the data to an operator through an interface or other user interface 112.

Figure 7:
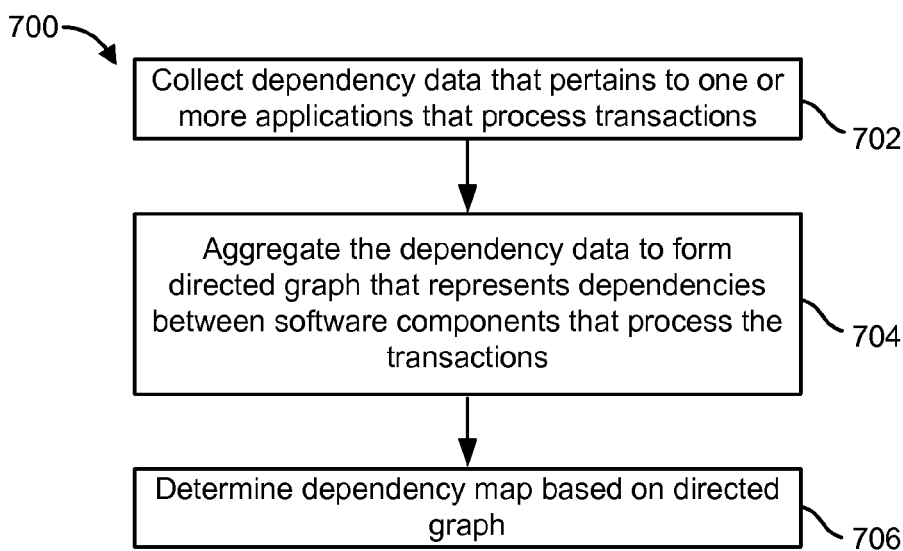
FIG. 7 is a flowchart depicting one embodiment of a process for determining a dependency map based on a digraph.

FIG. 7 is a flowchart depicting one embodiment of a process 700 for determining a dependency map 200 based on a digraph. Process 700 may be used in a system such as system 100 of FIGS. 1A-1B. Process 700 may be performed by the application monitor 101. The flow data that is sent to the security monitor 102 may be based on the digraph. However, note that there are other ways to generate flow data without forming a digraph. In step 702, dependency data is collected. The dependency data may be collected by agents 112. In one embodiment, the dependency data includes vertex data that describes software components and edge data that describes dependencies between the software components.

Note that the dependency data may include data for many different instances of a managed application 151 (e.g., Managed Application A 151A). For example, the system 100 might have a number of servers that each runs a different instance of Managed Application A 151A. In some cases, a single server might run different instances of Managed Application A 151A. Similar factors may apply to Managed Application B 151B. Also note that there may be many different instances of a particular type of transaction. As noted above, there may be many different instances of transaction BTA1, which might correspond to different users making a purchase. Thus, the dependency data may include data for many different instances of each type of transaction.

In step 704, the dependency data is aggregated to form a directed graph that represents dependencies between software components that process the transactions. In some embodiments, the directed graph includes vertices that correspond to various software components (e.g., servlets, EJB, device drivers, DBMS, sockets, etc.), as well as edges between pairs of the software components.

In optional step 706, a dependency map 200 is displayed based on the directed graph. Note that the dependency map 200 may reduce some of the complexity of the directed graph. For example, not all of the vertices in the directed graph need to be displayed in the dependency map 200. Likewise, not all of the edges in the directed graph need to be displayed in the dependency map. Note that the dependency map 200 may be displayed in response to a user request for a specified level of detail. Thus, it will be evident that although the flow data may be extracted from the directed graph, the flow data is typically not what is presented to the user in the dependency map 200.

Figure 8:
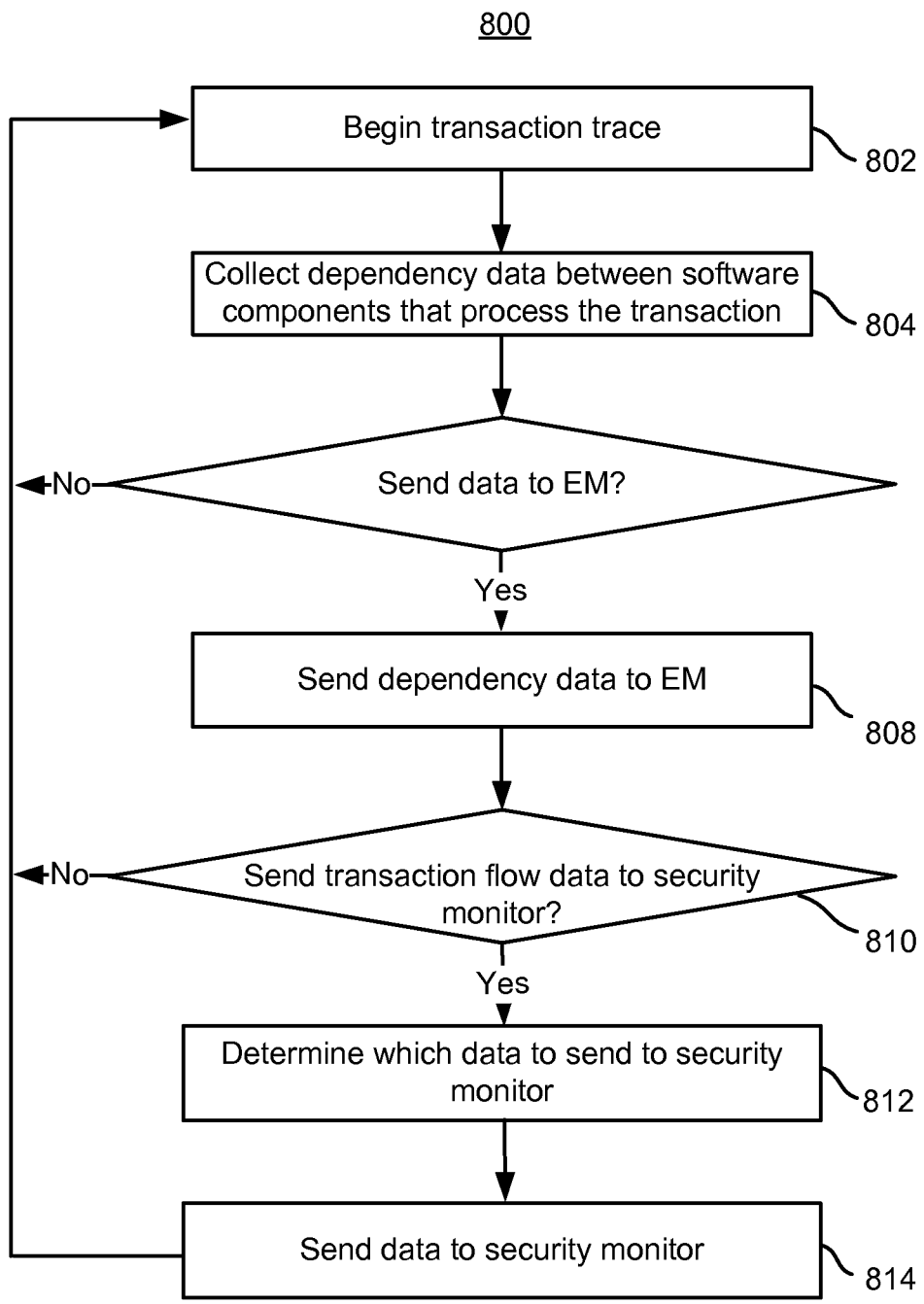
FIG. 8 is a flowchart that depicts one embodiment of a process of generating flow data to send to the security monitor.

FIG. 8 is a flowchart that depicts one embodiment of a process 800 of generating flow data to send to the security monitor 102. In this process 800, the flow data is formed from dependency data. In step 802, a transaction trace is begun. In one embodiment, a transaction trace begins when certain software components are identified as the first element in the transaction calling stack. These software components may be ones that have at some point been identified as being of interest. In some embodiments, the transaction trace captures boundaries of the transaction. The lower limit of the boundary may be defined by the first interesting element in the call stack. An interesting element can be pre-defined by specifying a type of component, such as a Servlet, that is considered interesting, as one example. In one embodiment, the upper boundary may be controlled by transactional calls outside the JVM (Java Virtual Machine). The lower boundary in the stack may be termed the Frontend, while the upper boundary may be termed the Backend. Referring to FIG. 1B as one example, component A1 might be a Frontend and component A2 might be a Backend.

In step 804, one or more agents 112 collect dependency data that represents dependencies between the software components that process the transaction. For example, the dependency data may include an edge between the Frontend and the Backend. Referring to transaction BTA1 in FIG. 1B, the arrow between component A1 and component A2 could be such an edge. A starting edge may also be created between an external entity and the Frontend vertex. Referring to FIG. 1B, the network 104 (or web browser 102) could be considered to be an external vertex. One reason for referring to the network 104 as an "external vertex" is that it may be outside of a virtual machine (e.g., JVM) on application server 110a. Thus, the starting edge would be between network 104 and component A1. There may also be an edge between component A2 and DatabaseX 113. Note that more than one agent could collect the dependency data for a single transaction. For example, agents 112a and 112b might both collect data for transaction BTA2.

In step 806, the agent 112 determines whether the dependency data should be provided to the Manager 120. The dependency data may be provided at any time and with any frequency. The dependency data may be provided in response to a request from Manager 120 or without a request. If the dependency data is not to be provided to the Manager 120, process 800 returns to step 802 to begin a trace of another transaction. Tracing another transaction could be tracing a different instance of transaction BTA1 or tracing a different type of transaction (e.g., BTA2)

At some point, the dependency data is sent from the agent(s) 112 to Manager 120 (step 808). As noted, the dependency data may describe edges and vertices. In step 810, Manager 120 stores the dependency data. In one embodiment, the Manager 120 adds an arrival timestamp to the dependency data. In one embodiment, the agent 112 adds a collection timestamp (e.g., time the dependency data was collected) to the data prior to sending to Manager 120. Note that Manager 120 may receive dependency data from many agents 112. This data from the different agents 112 may be combined.

In step 810, the Manager 120 determines whether flow data, based on the dependency data, should be sent to the security manager 102. This flow data may be sent at any interval. The flow data may be sent upon request from the security manager 102 or without any specific request. In one embodiment, the Manger 120 analyzes the dependency data to determine whether there are any previously unobserved component pairs. This was discussed with respect to the example of FIG. 5C. If there is such a previously unobserved component pair, the Manager 120 may determine that the security monitor 102 should be informed of this.

In step 812, the Manager 120 determines what dependency data should be used to send to the security monitor 102 as flow data. This may include pruning the dependency data such that the number of component pairs is reduced. In some embodiments, the Manager 120 selects "front end/back end" component pairs from the dependency data.

In step 814, the Manager 120 sends the flow data to the security manager 102. In the event that the Manager 120 detected a previously unobserved component pair, the Manager 120 might sent a special event notification to highlight this.

As noted above, Agents 112 may collect dependency data and send it to Manager 120. Table 1 shows an example of dependency data that could be collected for vertices. As noted, vertices may correspond to software components. In some embodiments, when the Manager 120 sends the flow data to the security manager 102 some of the following information is sent. In this example, each vertex has a set of "vertex properties."

TABLE 1

| Vertex Property | Description |
| --- | --- |
| Type | The type of software component. Examples include, but are not limited to, Starting Node, Front End, Back End, Servlet, EJB, etc. |
| Name | The name of the software component. Examples include, but are not limited to, class name, interface name, class-method name, database, URL, etc. |
| Update Time | The time at which the vertex was last updated. |

Table 2 shows an example of the types of dependency data that could be collected for edges. As noted, edge data may pertain to dependencies between a pair of software components (or vertices) as transactions are processed. In this example, each edge has a set of "edge properties."

TABLE 2

| Edge Property | Description |
| --- | --- |
| Head Vertex | The vertex (e.g., software component) at the end (head of arrow point to). |
| Tail Vertex | The vertex (e.g., software component) at the start (tail of arrow touches). |
| Owner | The name of the Application or Business Transaction that owns the edge. |
| Head Owner | Application that owns the head vertex/software component. |
| Tail Owner | Application that owns the tail vertex/software component. |
| Update Time | The time at which the edge was last encountered. |

The following elaborates on example edge properties. Referring to FIG. 1, the edge between component A1 and component A2 may be described as follows. The head vertex may be component A2. The tail vertex may be component A1. The edge owner may be managed application A 151A. The head vertex owner may be managed application A 151A. The tail vertex owner may be managed application A 151A.

As another example, the edge between component A3 and web server 109 may be described as follows. The head vertex may be the web server 109. The tail vertex may be component A3. The edge owner, head vertex owner, and tail vertex owner may all be managed application A 151A.

Note that the agent 112 could assign a special name for some components, such as "external vertex." For example, the web service 109 software component might be referred to as an "external vertex." The network 104 (or web browser 102) that sends a request to component A1 might also be called an "external vertex." One reason for this naming convention is that the actual software component that calls an application 151 might not be of interest to the security monitor 102. Therefore, a more general term such as "external vertex" may provide sufficient detail.

One embodiment disclosed herein includes a machine-implemented method for detecting possible security threats. The method may include determining first flow patterns based on first flow data that describes sequences of software components that are invoked in one or more applications for a first time period; determining second flow patterns based on second flow data that describes sequences of software components that are invoked in the one or more applications for a second time period; and determining whether there is a possible security threat based on a comparison of the second flow patterns with the first flow patterns.

One embodiment disclosed herein includes a system for detecting possible security threats. The system includes one or more processors and computer readable storage coupled to the one or more processors. The computer readable storage has computer readable instructions stored thereon which, when executed on the one or more processors, cause the one or more processors to perform the following. The one or more processors trace transactions that are processed by software components in the system and determine component pairs for the traced transactions. A component pair includes two software components that are used to process a given transaction. The flow for a given transaction includes a sequence of one or more component pairs. The one or more processors determine normal transaction flow patterns based on component pairs for a first time period and determine transaction flow patterns based on component pairs for a second period of time after the first time period. The one or more processors determine whether there is a possible security threat based on a deviation of the of the transaction flows for the second period from the normal transaction flows.

One embodiment disclosed herein includes computer readable storage having computer readable instructions stored thereon for programming at least one processor to perform a method for determining a possible security threat. The method includes receiving counts of combinations of component pairs for a first time period, a combination of component pairs includes a sequence of one or more of the component pairs. The method includes determining first flow patterns based on the counts of combinations of component pairs for the first time period. The method includes receiving counts of combinations of component pairs for a second time period, and determining second flow patterns based on the counts of combinations of component pairs for the second time period. The method includes determining a possible security threat based on a deviation between the first flow patterns and the second flow patterns.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of embodiments and practical applications, to thereby enable others skilled in the art to best utilize various embodiments and with various modifications as are suited to the particular use contemplated. It is intended that the scope of the disclosure be defined by the claims appended hereto.

What is claimed is:

1. A machine-implemented method comprising:
   determining first flow patterns based on first flow data that describes sequences of software components in one or more applications and how many times each sequence of software components was invoked for a first time period;
   determining second flow patterns based on second flow data that describes sequences of software components in the one or more applications and how many times each sequence of software components was invoked for a second time period; and
   determining whether there is a possible security threat based on a comparison of the second flow patterns with the first flow patterns.

2. The method of claim 1, wherein the determining first flow patterns, the determining the second flow patterns and the determining whether there is a possible security threat comprises:
   determining a first mix of sequences of software components that are invoked based on the first flow data;
   determining a second mix of sequences of software components that are invoked based on the second flow data; and
   determining whether the second mix differs from the first mix by more than a threshold amount.

3. The method of claim 1, wherein the determining first flow patterns and the determining the second flow patterns comprises:
   determining a first mix of sequences of software components that are invoked for a first type of transaction based on the first flow data; and
   determining a second mix of sequences of software components that are invoked for the first type of transaction based on the second flow data.

4. The method of claim 1, wherein each the sequences of software components that are invoked corresponds to a transaction that is processed by the one or more applications.

5. The method of claim 4, wherein the first flow data and the second flow data each comprise counts of failed transactions.

6. The method of claim 4, wherein the first flow data and the second flow data comprise component pairs, a component pair comprises two of the software components that are invoked to process the transaction, the flow for a given one of the transactions comprises a sequence of one or more component pairs.

7. The method of claim 6, wherein at least some of the component pairs comprise a software component at a front end of a first of the one or more applications and a software component at a back end of the first application.

8. The method of claim 6, wherein the determining whether there is a possible security threat comprises:
   determining that a component pair exists in the second flow data that did not exist in the first flow data.

9. The method of claim 4, wherein the determining whether there is a possible security threat comprises:
   determining that a sequence of component pairs exist in the second flow data that did not exist in the first flow data.

10. The method of claim 4, wherein the determining whether there is a possible security threat comprises:
    determining that the second flow data does not specify what software component called a particular software component in the second flow data.

11. The method of claim 1, wherein the determining whether there is a possible security threat comprises:
    determining that the number of errors for a particular one of the sequences of software components exceeded a threshold.

12. The method of claim 1, wherein the first flow patterns comprise first percentages for each sequence of software components invoked for the first time period, the second flow patterns comprise second percentages for each sequence of software components invoked for the second time period, the determining whether there is a possible security threat comprises comparing the second percentages to the first percentages.

13. A system comprising:
    a processor; and
    computer readable storage coupled to the processor, the computer readable storage having computer readable instructions stored thereon, the computer readable instructions which, when executed on the processor, cause the processor to:
    trace transactions that are processed by software components in the system;
    determine sequences of software components invoked to process the traced transactions and counts of the sequences;
    determine normal transaction flow patterns based on the counts of the sequences of software components for a first time period;
    determine transaction flow patterns based on the counts of the sequences of the software components for a second period of time after the first time period; and
    determine whether there is a possible security threat based on a deviation of the transaction flow patterns for the second period from the normal transaction flow patterns.

14. The system of claim 13, wherein the sequence of software components invoked to process a given transaction an ordered sequence of component pairs.

15. The system of claim 14, wherein the system comprises an application monitor and a security monitor, the computer readable instructions which, when executed on the processor, cause the application monitor to send an event notification to the security monitor in response to detecting a component pair that was not detected during any previous time period.

16. The system of claim 13, wherein the computer readable instructions which, when executed on the processor, cause the processor to determine counts of failed transactions.

17. The system of claim 14, wherein the computer readable instructions which, when executed on the processor, cause the processor to determine normal transaction flow patterns, to determine transaction flow patterns for a second period of time, and to determine whether there is a possible security threat comprise computer readable instructions which, when executed on the processor, cause the processor to:
    determine a first mix of transaction flow patterns based on the component pairs for the first time period;
    determine a second mix of transaction flow patterns based on the component pairs for the second time period; and
    determine whether the second mix of transaction flow patterns deviates from the first mix of transaction flow patterns by more than a threshold.

18. The system of claim 14, wherein the computer readable instructions which, when executed on the processor, cause the processor to determine normal transaction flow patterns, to determine transaction flow patterns for a second period of time, and to determine whether there is a possible security threat comprise computer readable instructions which, when executed on the processor, cause the processor to:
    determine a first mix of flow patterns for a first transaction based on the component pairs for the first time period;
    determine a second mix of flow patterns for the first transaction based on the component pairs for the second time period; and
    determine whether the second mix of flows for the first transaction deviates from the first mix of flows for the first transaction by more than a threshold.

19. The system of claim 14, wherein the computer readable instructions which, when executed on the processor, cause the processor to determine whether there is a possible security threat comprise computer readable instructions which, when executed on the processor, cause the processor to:
    determine that a component pair exists in the component pairs for the second time period that did not exist in the component pairs for the first time period.

20. The system of claim 14, wherein the computer readable instructions which, when executed on the processor, cause the processor to determine whether there is a possible security threat comprise computer readable instructions which, when executed on the processor, cause the processor to:
    determine that a combination of component pairs exist in the component pairs for the second time period that did not exist in the component pairs for the first time period.

21. The system of claim 13, wherein the computer readable instructions which, when executed on the processor, cause the processor to determine whether there is a possible security threat comprise computer readable instructions which, when executed on the processor, cause the processor to:
    determine that the number of errors for a transaction associated with a particular sequence of software components exceeded a threshold.

22. Non-transitory computer readable storage comprising computer readable instructions stored thereon for programming at least one processor to:
    receive counts of sequences of component pairs that process requests for a first time period, a component pair identifies two software components that process a request;
    determine first flow patterns based on the counts of the sequences of component pairs that process requests for the first time period;

receive counts of sequences of component pairs that process requests for a second time period;

determine second flow patterns based on the counts of sequences of component pairs that process requests for the second time period; and determine a possible security threat based on a deviation between the first flow patterns and the second flow patterns.

23. The non-transitory computer readable storage of claim 22, wherein a component pair identifies a software component at a front end of a first of one or more applications and a software component at a back end of the first application.

24. The non-transitory computer readable storage of claim 22, wherein the instructions that cause the processor to determine the first flow patterns, to determine the second flow patterns, and to determine a possible security threat comprise instructions that cause the processor to:

determine a first mix of sequences of component pairs that are invoked based on the counts of sequences of component pairs that process requests for the first time period;

determine a second mix of sequences of component pairs that are invoked based on the counts of sequences of component pairs that process requests for the second time period; and determine whether the second mix differs from the first mix by more than a threshold amount.

\* \* \* \* \*